(12) United States Patent
Custodio

(10) Patent No.: US 10,606,779 B2
(45) Date of Patent: Mar. 31, 2020

(54) METHODS AND APPARATUS FOR PERFORMING PARTIAL RECONFIGURATION IN A PIPELINE-BASED NETWORK TOPOLOGY

(71) Applicant: Altera Corporation, San Jose, CA (US)

(72) Inventor: Evan Custodio, San Jose, CA (US)

(73) Assignee: Altera Corporation, San Jose, CA (US)

( * ) Notice: Subject to any disclaimer, the term of this patent is extended or adjusted under 35 U.S.C. 154(b) by 420 days.

(21) Appl. No.: 15/268,281

(22) Filed: Sep. 16, 2016

(65) Prior Publication Data

US 2018/0081840 A1 Mar. 22, 2018

(51) Int. Cl.
*G06F 13/366* (2006.01)
*G06F 9/4401* (2018.01)
*G06F 13/40* (2006.01)
*G06F 15/78* (2006.01)

(52) U.S. Cl.
CPC .......... *G06F 13/366* (2013.01); *G06F 9/4405* (2013.01); *G06F 13/4022* (2013.01); *G06F 13/4068* (2013.01); *G06F 15/7867* (2013.01)

(58) Field of Classification Search
CPC ............... G06F 13/366; G06F 13/4022; G06F 13/4068; G06F 13/404; G06F 12/023; G06F 12/0284; G06F 12/0292; G06F 12/0891; G06F 12/10; G06F 12/1009; G06F 12/1027; G06F 13/42; G06F 2212/50; G06F 2212/60; G06F 2212/683; G06F 3/0604; G06F 3/0631; G06F 3/0647; G06F 3/067; G06F 13/364; G06F 13/4081; G06F 13/4282; G06F 15/17387; G06F 1/3287
USPC .................... 710/1, 29, 31, 33, 38, 109, 316
See application file for complete search history.

(56) References Cited

U.S. PATENT DOCUMENTS

| | | | | |
|---|---|---|---|---|
| 5,404,461 A | * | 4/1995 | Olnowich | ........... G06F 13/4022 710/316 |
| 5,408,646 A | * | 4/1995 | Olnowich | ........... G06F 13/4022 714/4.1 |
| 5,787,081 A | * | 7/1998 | Bennett | .................... H04L 12/56 370/388 |
| 7,330,695 B2 | | 2/2008 | Karschnia et al. | |

(Continued)

*Primary Examiner* — Farley Abad
*Assistant Examiner* — Henry W Yu
(74) *Attorney, Agent, or Firm* — Treyz Law Group; Jason Tsai

(57) ABSTRACT

A programmable integrated circuit that can support partial reconfiguration is provided. The programmable integrated circuit may include multiple processing nodes that serve as accelerator blocks for an associated host processor that is communicating with the integrated circuit. The processing nodes may be connected in a hybrid shared-pipelined topology. Each pipeline stage in the hybrid architecture may include a bus switch and at least two shared processing nodes connected to the output of the bus switch. The bus switched may be configured to route an incoming packet to a selected one of the two processing nodes in that pipeline stage or may only route the incoming packet to the active node if the other node is undergoing partial reconfiguration. Configured in this way, the hybrid topology supports partial reconfiguration of the processing nodes without disrupting or limiting the operating frequency of the overall network.

20 Claims, 9 Drawing Sheets

(56) References Cited

U.S. PATENT DOCUMENTS

| | | | |
|---|---|---|---|
| 7,590,760 B1 | 9/2009 | Banks et al. | |
| 7,864,620 B1 | 1/2011 | Pedersen | |
| 8,184,626 B2 * | 5/2012 | Scott | G06F 15/17362 370/362 |
| 9,049,142 B1 * | 6/2015 | Osborne | H04L 45/28 |
| 9,330,433 B2 | 5/2016 | Koker et al. | |
| 9,377,987 B2 * | 6/2016 | Law | G06F 3/14 |
| 9,485,172 B2 * | 11/2016 | Yoshimoto | H04L 45/28 |
| 2002/0046324 A1 * | 4/2002 | Barroso | G06F 12/0826 711/122 |
| 2004/0181614 A1 | 9/2004 | Furtek et al. | |
| 2004/0230709 A1 * | 11/2004 | Moll | G06F 13/4022 710/1 |
| 2008/0285379 A1 * | 11/2008 | Bishop | G01V 1/201 367/14 |
| 2008/0304407 A1 * | 12/2008 | Umansky | H04L 12/437 370/222 |
| 2011/0264888 A1 * | 10/2011 | Dasu | G06F 15/7867 712/15 |
| 2013/0051220 A1 * | 2/2013 | Ryshakov | H04L 12/4625 370/221 |
| 2013/0051236 A1 * | 2/2013 | Bush | H04L 45/302 370/237 |
| 2013/0162290 A1 | 6/2013 | Margabandu et al. | |
| 2014/0082237 A1 * | 3/2014 | Wertheimer | G06F 13/4022 710/104 |
| 2014/0244706 A1 * | 8/2014 | Zhang | G06F 15/17387 709/201 |
| 2014/0281379 A1 | 9/2014 | Hutton et al. | |
| 2014/0282560 A1 | 9/2014 | Hutton et al. | |
| 2015/0010000 A1 | 1/2015 | Zhang et al. | |
| 2015/0071632 A1 * | 3/2015 | Koka | H04Q 11/00 398/45 |
| 2015/0088948 A1 * | 3/2015 | Perry | G06F 1/02 708/230 |
| 2015/0098477 A1 * | 4/2015 | Li | H04B 10/2503 370/535 |
| 2016/0182256 A1 | 6/2016 | Anders et al. | |

* cited by examiner

METHODS AND APPARATUS FOR PERFORMING PARTIAL RECONFIGURATION IN A PIPELINE-BASED NETWORK TOPOLOGY

BACKGROUND

This relates to integrated circuits and, more particularly, to programmable integrated circuits.

Programmable integrated circuits are a type of integrated circuit that can be programmed by a user to implement a desired custom logic function. In a typical scenario, a logic designer uses computer-aided design tools to design a custom logic circuit. When the design process is complete, the computer-aided design tools generate configuration data. The configuration data is loaded into memory elements to configure the devices to perform the functions of the custom logic circuit.

Memory elements are often formed using random-access-memory (RAM) cells. Because the RAM cells are loaded with configuration data during device programming, the RAM cells are sometimes referred to as configuration memory or configuration random-access-memory cells (CRAM). During normal operation of a programmable device, loaded CRAM cells produce static output signals that are applied to the gates of transistors (e.g., pass transistors). The CRAM output signals turn some transistors on and turn other transistors off. This selective activation of certain transistors on the programmable device customizes the operation of the programmable device so that the programmable device performs its intended function.

Configuration data may be supplied to a programmable device in the form of a configuration bit stream. After a first configuration bit stream has been loaded onto a programmable device, the programmable device may be reconfigured by loading a different configuration bit stream in a process known as reconfiguration. An entire set of configuration data is often loaded during reconfiguration. However, it may sometimes be advantageous to reconfigure only a portion of the configuration bits using a process known as partial reconfiguration.

In certain applications, a programmable device includes multiple processing nodes each of which is configured to perform a respective function for a master driver. In a conventional shared bus topology, all the processing nodes are directly connected to the master driver via a high fan-out interface. Although this topology supports partial reconfiguration during which one of the nodes can be reprogrammed without interrupting the rest of the system, the amount of traffic congestion at the fan-out interface is high and can substantially cripple the performance of the system. In another conventional topology, the processing nodes are connected strictly in series. While this arrangement provides high throughput, the latency is dependent on the number of series-connected stages and more importantly, the entire system will collapse if any one of the nodes undergoes partial reconfiguration.

It is within this context that the embodiments herein arise.

SUMMARY

A system may include a host processor coupled to a coprocessor that serves as a hardware accelerator for the host processor. The coprocessor may include multiple processing nodes connected in a hybrid shared-pipelined topology. The hybrid topology allows at least one of the processing nodes to undergo partial reconfiguration (PR) while the remaining nodes continue to process incoming packets for the host processor. The packets may include a stream of data that can be rendered by one or more processing nodes in the coprocessor. Configured in this way, partial reconfiguration can be supported while maintaining high performance at the interface between the host processor and the coprocessor.

The hybrid topology may include a series of pipelined stages. Each pipelined stage may include a bus switch that selectively routes packets to one of two associated processing nodes (e.g., a north processing node or a south processing node). If the north processing node is inactive (i.e., if the north node is undergoing PR), the bus switch may automatically route any incoming traffic to the south processing node. If, however, the south processing node is inactive (i.e., if the south node is undergoing PR), the bus switch may automatically route the incoming traffic to the north processing node. Optionally, the incoming traffic may be routed to the next pipeline stage via an optional bypass path.

Each processing node may be assigned a respective address. The bus switch may route packets according to the address. If the intended address matches that of the north processing node, the bus switch will route the incoming packet to the north processing node (assuming it is active). If the intended address matches that of the south processing node, the bus switch will route the incoming packet to the south processing node (assuming it is active). If the intended address does not match with either the address of the north or south processing node, the bus switch may route the incoming packet to any one of the north or south processing node (assuming the destination node is active).

Further features of the invention, its nature and various advantages will be more apparent from the accompanying drawings and following detailed description.

DETAILED DESCRIPTION

Embodiments of the present invention relate to integrated circuits and, more particularly, to programmable integrated circuits. It will be recognized by one skilled in the art, that the present exemplary embodiments may be practiced without some or all of these specific details. In other instances, well-known operations have not been described in detail in order not to unnecessarily obscure the present embodiments.

Programmable integrated circuits use programmable memory elements to store configuration data. During programming of a programmable integrated circuit, configuration data is loaded into the memory elements. The memory elements may be organized in arrays having numerous rows and columns. For example, memory array circuitry may be formed in hundreds or thousands of rows and columns on a programmable logic device integrated circuit.

During normal operation of the programmable integrated circuit, each memory element provides a static output signal. The static output signals that are supplied by the memory elements serve as control signals. These control signals are applied to programmable logic on the integrated circuit to customize the programmable logic to perform a desired logic function.

It may sometimes be desirable to reconfigure only a portion of the memory elements during normal operation. This type of reconfiguration in which only a subset of memory elements are being loaded with new configuration data is sometimes referred to as "partial reconfiguration." During partial reconfiguration, new data should be written into a selected portion of memory elements (sometimes referred to as "memory cells").

Figure 1:
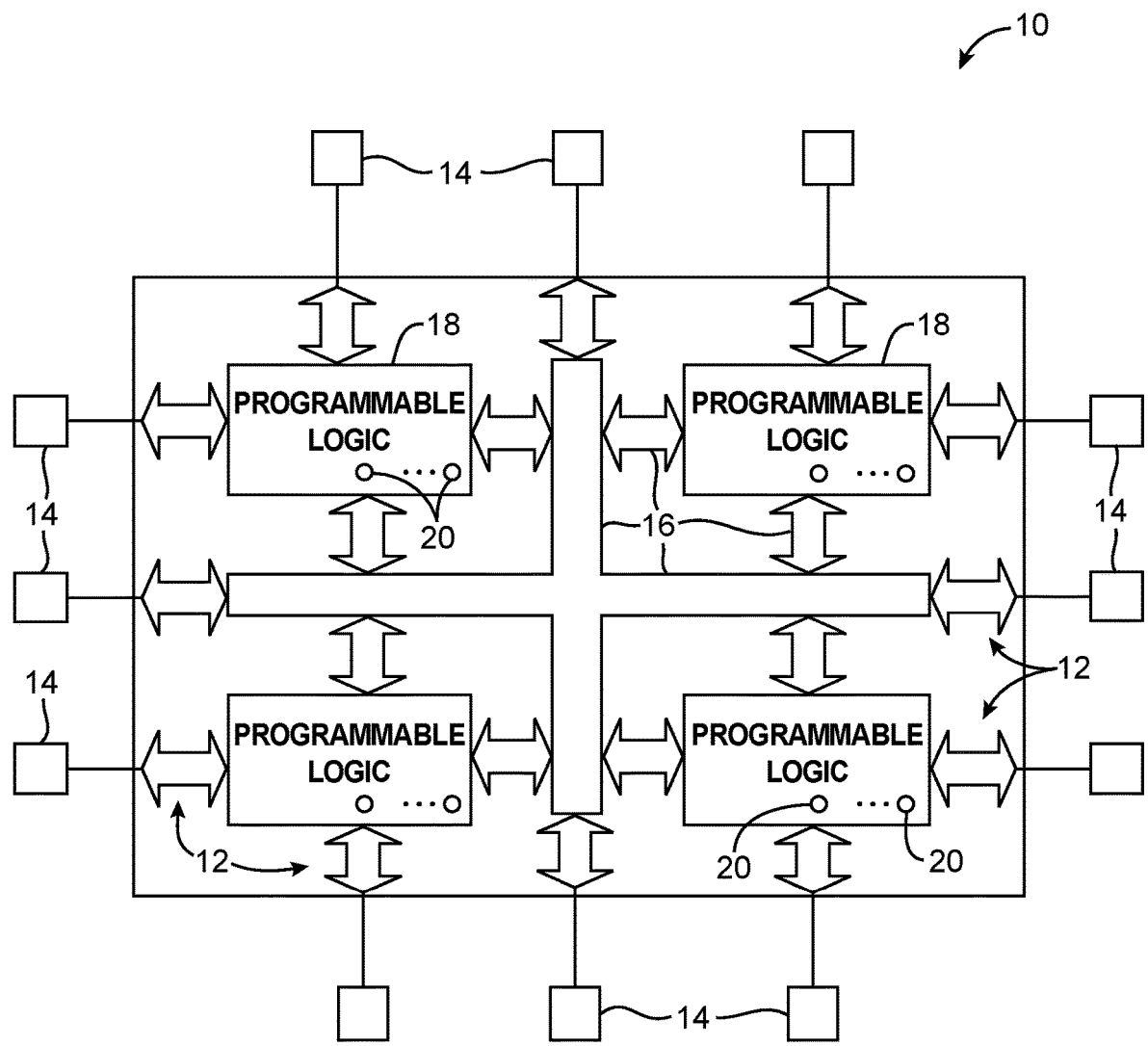
FIG. 1 is a diagram of an illustrative programmable integrated circuit in accordance with an embodiment.

An illustrative programmable integrated circuit such as programmable logic device (PLD) 10 is shown in FIG. 1. As shown in FIG. 1, programmable integrated circuit 10 may have input-output circuitry 12 for driving signals off of device 10 and for receiving signals from other devices via input-output pins 14. Interconnection resources 16 such as global and local vertical and horizontal conductive lines and buses may be used to route signals on device 10. Interconnection resources 16 include fixed interconnects (conductive lines) and programmable interconnects (i.e., programmable connections between respective fixed interconnects). Programmable logic 18 may include combinational and sequential logic circuitry. The programmable logic 18 may be configured to perform a custom logic function.

Programmable integrated circuit 10 contains memory elements 20 that can be loaded with configuration data (also called programming data) using pins 14 and input-output circuitry 12. Once loaded, the memory elements 20 may each provide a corresponding static control output signal that controls the state of an associated logic component in programmable logic 18. Typically the memory element output signals are used to control the gates of metal-oxide-semiconductor (MOS) transistors. Some of the transistors may be p-channel metal-oxide-semiconductor (PMOS) transistors. Many of these transistors may be n-channel metal-oxide-semiconductor (NMOS) pass transistors in programmable components such as multiplexers. When a memory element output is high, an NMOS pass transistor controlled by that memory element will be turned on to pass logic signals from its input to its output. When the memory element output is low, the pass transistor is turned off and does not pass logic signals.

A typical memory element 20 is formed from a number of transistors configured to form cross-coupled inverters. Other arrangements (e.g., cells with more distributed inverter-like circuits) may also be used. With one suitable approach, complementary metal-oxide-semiconductor (CMOS) integrated circuit technology is used to form the memory elements 20, so CMOS-based memory element implementations are described herein as an example. In the context of programmable integrated circuits, the memory elements store configuration data and are therefore sometimes referred to as configuration random-access memory (CRAM) cells.

Figure 2:
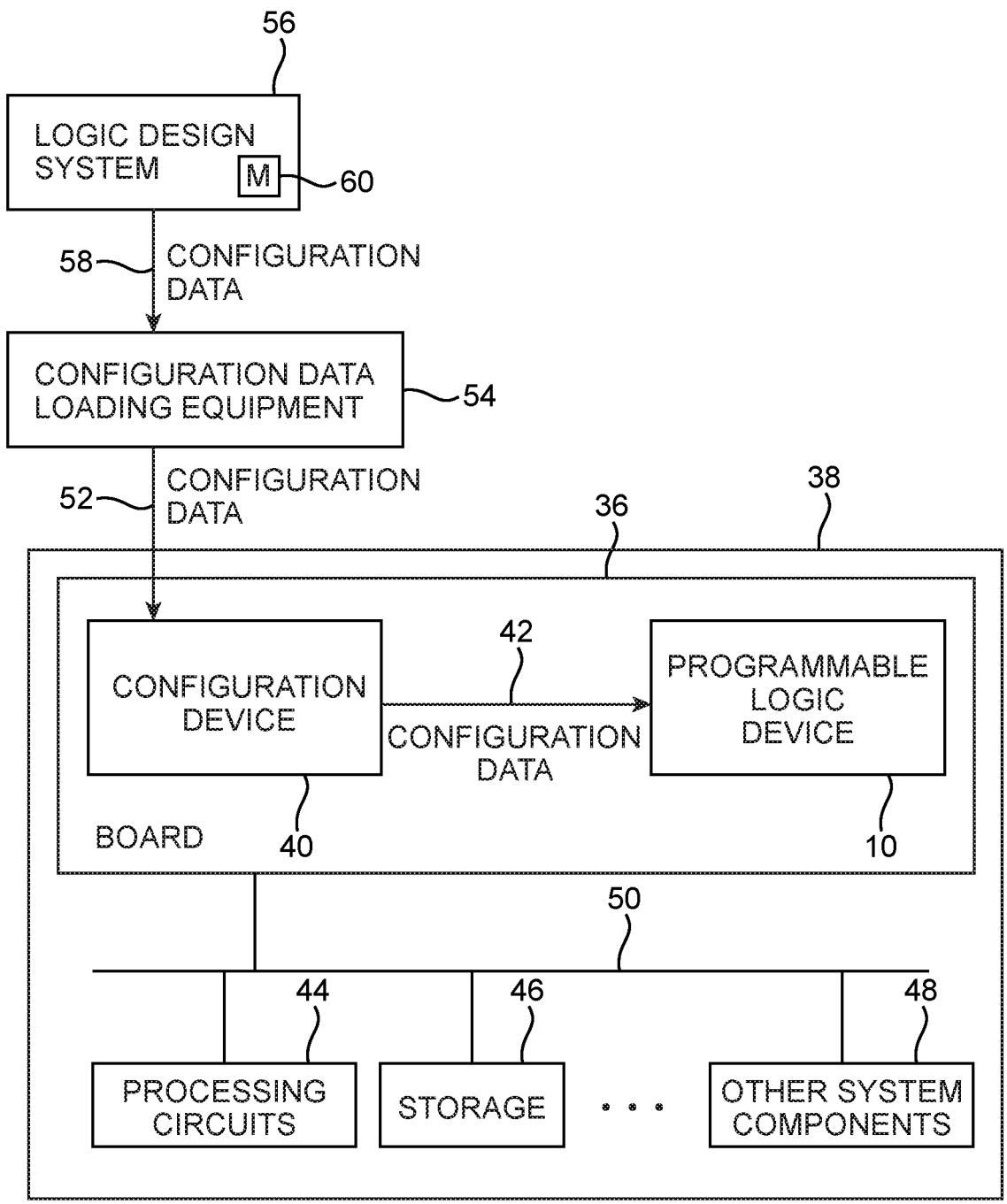
FIG. 2 is a diagram showing how configuration data is created by a logic design system and loaded into a programmable device to configure the device for operation in a system in accordance with an embodiment.

An illustrative system environment for device 10 is shown in FIG. 2. Device 10 may be mounted on a board 36 in a system 38. In general, programmable logic device 10 may receive configuration data from programming equipment or from other suitable equipment or device. In the example of FIG. 2, programmable logic device 10 is the type of programmable logic device that receives configuration data from an associated integrated circuit 40. With this type of arrangement, circuit 40 may, if desired, be mounted on the same board 36 as programmable logic device 10.

Circuit 40 may be an erasable-programmable read-only memory (EPROM) chip, a programmable logic device configuration data loading chip with built-in memory (sometimes referred to as a "configuration device"), or other suitable device. When system 38 boots up (or at another suitable time), the configuration data for configuring the programmable logic device may be supplied to the programmable logic device from device 40, as shown schematically by path 42. The configuration data that is supplied to the programmable logic device may be stored in the programmable logic device in its configuration random-access-memory elements 20.

System 38 may include processing circuits 44, storage 46, and other system components 48 that communicate with device 10. The components of system 38 may be located on one or more boards such as board 36 or other suitable mounting structures or housings and may be interconnected by buses, traces, and other electrical paths 50.

Configuration device 40 may be supplied with the configuration data for device 10 over a path such as path 52. Configuration device 40 may, for example, receive the configuration data from configuration data loading equipment 54 or other suitable equipment that stores this data in configuration device 40. Device 40 may be loaded with data before or after installation on board 36.

It can be a significant undertaking to design and implement a desired logic circuit in a programmable logic device. Logic designers therefore generally use logic design systems based on computer-aided-design (CAD) tools to assist them in designing circuits. A logic design system can help a logic designer design and test complex circuits for a system. When a design is complete, the logic design system may be used to generate configuration data for electrically programming the appropriate programmable logic device.

As shown in FIG. 2, the configuration data produced by a logic design system 56 may be provided to equipment 54 over a path such as path 58. The equipment 54 provides the configuration data to device 40, so that device 40 can later provide this configuration data to the programmable logic device 10 over path 42. Logic design system 56 may be based on one or more computers and one or more software programs. In general, software and data may be stored on any computer-readable medium (storage) in system 56 and is shown schematically as storage 60 in FIG. 2.

In a typical scenario, logic design system 56 is used by a logic designer to create a custom circuit design. The system 56 produces corresponding configuration data which is provided to configuration device 40. Upon power-up, configuration device 40 and data loading circuitry on programmable logic device 10 is used to load the configuration data into CRAM cells 20 of device 10. Device 10 may then be used in normal operation of system 38.

After device 10 is initially loaded with a set of configuration data (e.g., using configuration device 40), device 10 may be reconfigured by loading a different set of configuration data. Sometimes it may be desirable to reconfigure only a portion of the memory cells on device 10 via a process sometimes referred to as partial reconfiguration. As memory cells are typically arranged in an array, partial reconfiguration can be performed by writing new data values only into selected portion(s) in the array while leaving portions of array other than the selected portion(s) in their original state.

Figure 3:
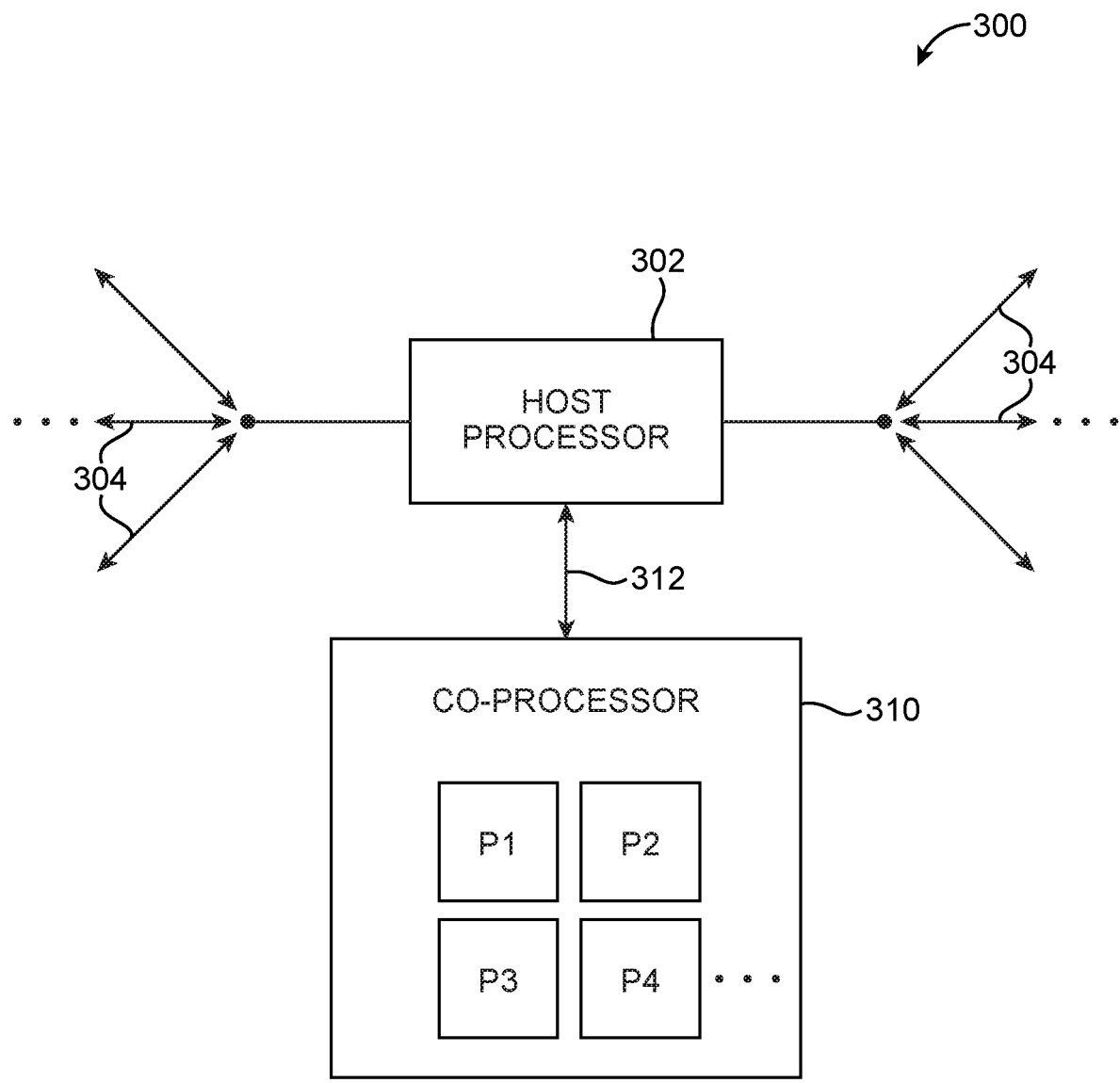
FIG. 3 is a diagram showing how a programmable integrated circuit may be used as a coprocessor in support of a host processor in accordance with an embodiment.

Partial reconfiguration may be a particularly useful feature when developing an acceleration framework. For example, consider a scenario in which a system such as system 300 includes a host processor 302 that is coupled to other network components via paths 304 (see, e.g., FIG. 3). As shown in FIG. 3, host processor 302 may be coupled to a coprocessor such as coprocessor 310 via path 312. Coprocessor 310 may be a programmable integrated circuit such as device 10 of FIG. 1 and may include various processing nodes such as nodes P1-P4 to help accelerate the performance of host processor 302.

Configured as such, coprocessor 310 may sometimes be referred to as a "hardware accelerator." As examples, the processing nodes on the coprocessor may be used to accelerate a variety of functions, which may include but are not limited to: encryption, Fast Fourier transforms, video encoding/decoding, convolutional neural networks (CNN), firewalling, intrusion detection, database searching, domain name service (DNS), load balancing, caching network address translation (NAT), and other suitable network packet processing applications, just to name a few.

Existing hardware acceleration is bespoke with no dynamic reconfigurability. Dynamic reconfigurability in accelerators can help offer enhanced flexibility and agility, improved data path line rate performance, and optimized power efficiency in communications networks. Thus, loading and unloading a portion of the processing nodes (sometimes referred to as accelerator blocks) on the fly is imperative. The interface 312 between host processor 302 and acceleration processor 310 may have large bit widths and high bandwidth requirements (e.g., more than 512 bits running at 400 MHz or more). As such, using host processor 302 to partially reconfigure coprocessor 310 via this interface without disrupting system operations can be fairly challenging.

Figure 4:
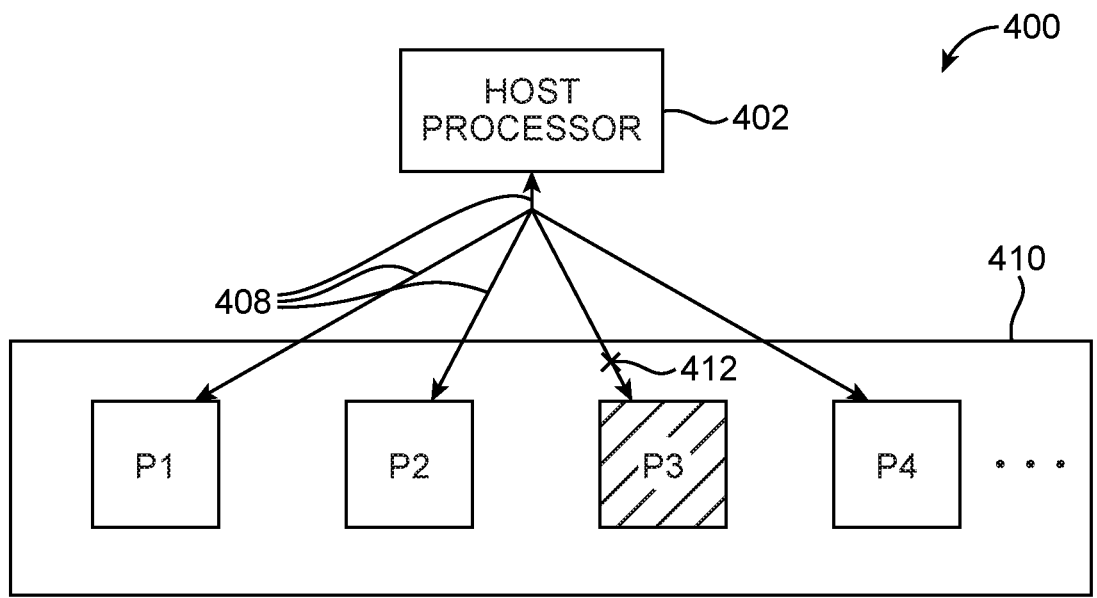
FIG. 4 is a diagram of multiple processing nodes connected to a host processor via a shared bus architecture.

FIG. 4 is a diagram of a system 400 arranged using one suitable bus topology for coupling a host processor 402 to a coprocessor 410. As shown in FIG. 4, coprocessor 402 includes four processing nodes P1, P2, P3, and P4 that are coupled to host processor 402 via a shared bus 408. Each of the processing nodes will be assigned a respective sub-address. Whenever host processor 402 needs to communicate with a particular processing node, processor 402 will look for the corresponding sub-address.

This exemplary topology can support partial reconfiguration since the host processor 402 can still communicate with all other nodes while one of the nodes is undergoing partial reconfiguration. In the example of FIG. 4, node P3 (shaded) may be undergoing partial reconfiguration. During this partial reconfiguration operation, nodes P1, P2, and P4 may continue communicating with host processor 402 via shared bus 408. Host processor 402 will be aware that node P3 is currently inactive and will not send any traffic towards node P3 (as indicated by temporarily broken path 412). While this shared bus topology supports partial reconfiguration, there will be substantial routing congestion due to the high fan-out at the shared bus interface, which can cripple the maximum operating frequency of system 400. For example, it may be challenging for logic design system 56 to perform place and route operations for different processing nodes on device 10, especially where each of the processing nodes has high bandwidth requirements and therefore need to be placed near the chip border to optimize timing.

Figure 5:
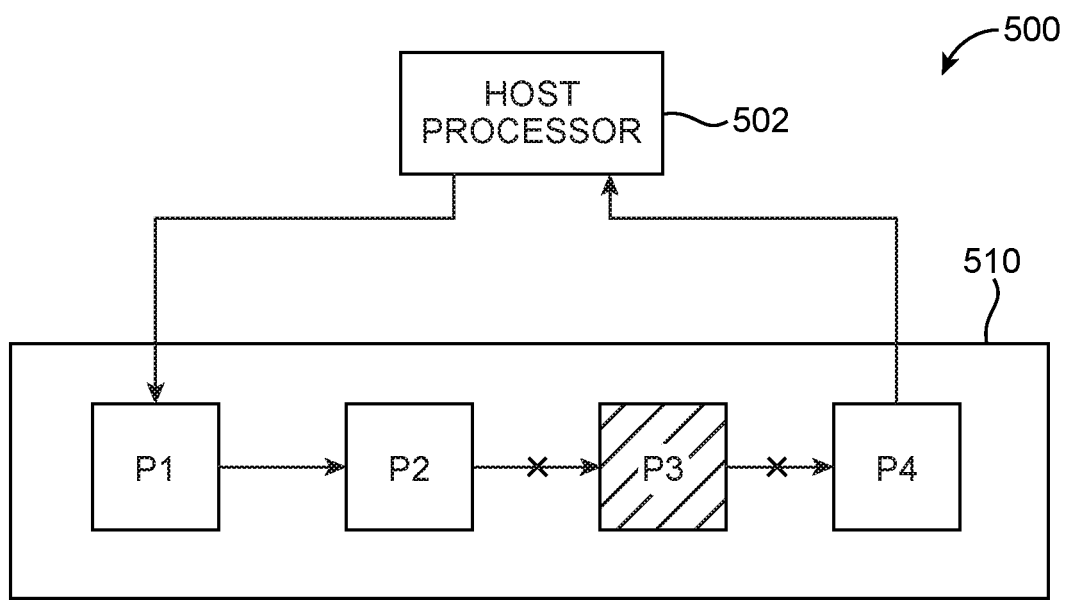
FIG. 5 is a diagram of multiple processing nodes connected to a host processor via a strict pipelined bus architecture.

FIG. 5 is a diagram of a system 500 arranged using another suitable bus topology for coupling a host processor 502 to a coprocessor 510. As shown in FIG. 5, coprocessor 502 includes four processing nodes P1, P2, P3, and P4. In particular, nodes P1-P4 are connected in a strict pipelined configuration in which nodes P1-P4 are coupled in a chain. Each of the processing nodes will be assigned a respective sub-address. Sub-addressing is usually provided by some data element in-band of a packet. A packet may include a stream of data that can be rendered by one or more processing nodes in coprocessor 510.

To send a packet to node P2, host processor 502 will first send the packet directly to leading node P1, which will then forward the packet to node P2. Node P2 is aware that it is the intended recipient based on the associated sub-address. After the desired processing has been performed on the packet, node P2 will then forward the corresponding output packet back to host processor 502 via intervening nodes P3 and P4.

The low fan-out architecture of FIG. 5 is particularly suitable for large bus sizes operating at high frequencies. This pipelined architecture, however, cannot support partial reconfiguration. Consider the example of FIG. 5 in which node P3 (shaded) is undergoing partial reconfiguration. Reconfiguring only node P3 will switch node P3 out of use, effectively severing the entire pipeline network. As a result, the whole pipeline topology will collapse if any one node in the pipeline undergoes partial reconfiguration.

Figure 6:
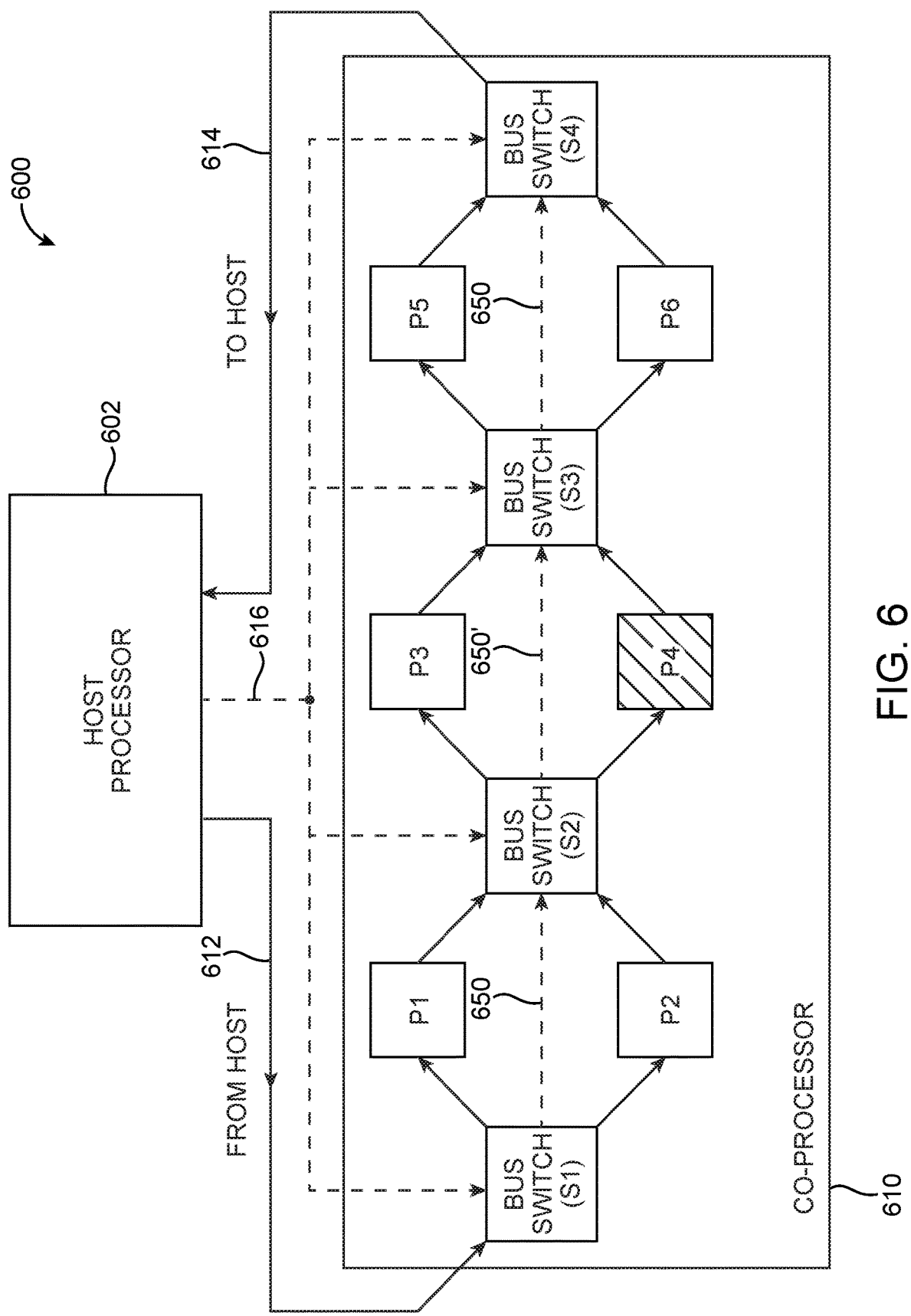
FIG. 6 is a diagram of illustrative routing fabric that includes a plurality of processing nodes interconnected in a hybrid shared-pipelined topology, which can support partial reconfiguration without system interruption in accordance with an embodiment.

In accordance with an embodiment, FIG. 6 shows an illustrative system 600 of a hybrid bus routing topology where the acceleration processing nodes are pipelined and shared at every pipeline stage. As shown in FIG. 6, system 600 may include a host processor 602 (sometimes referred to as a "master node" that runs a host software driver) that communicates with coprocessor 610. Coprocessor 610 may include multiple processing nodes P1-P6. These processing nodes are sometimes referred to as acceleration blocks.

The processing nodes may be grouped into pairs, where each pair includes a "north" processing block and a "south" processing block. In the example of FIG. 6, coprocessor 610 includes a first pair with nodes P1 and P2, a second pair with nodes P3 and P4, and a third pair with nodes P5 and P6. Each node pair stage may be coupled to a successive node pair stage to form a chain or pipeline of processing node pair stages.

A bus switch may be formed at the input/ingress and the output/egress of each processing node pair stage. In particular, each bus switch may have a first input (sometimes referred to as a north ingress port), a second input (sometimes referred to as a south ingress port), a first output (sometimes referred to as a north egress port), and a second output (sometimes referred to as a south egress port).

In the exemplary embodiment of FIG. 6, a first bus switch S1 may have its first input receiving information from host processor 602 via path 612, a second input that is unused, and first and second outputs coupled to nodes P1 and P2, respectively. A second bus switch S2 may have first and second inputs that receive signals from nodes P1 and P2, respectively, and first and second outputs coupled to nodes P3 and P4, respectively. Similarly, a third bus switch S3 may have first and second inputs that receive signals from nodes P3 and P4, respectively, and first and second outputs coupled to nodes P5 and P6, respectively. A fourth bus switch S4 may have first and second inputs that receive signals from nodes P5 and P6, respectively, a first output coupled to host processor 602 via path 614, and a second output that is unused. Connected as such, nodes P1 and P2 may be said to be coupled in parallel between bus switches S1 and S2. Similarly, nodes P3 and P4 may be considered to be coupled in parallel between bus switches S2 and S3, etc.

The bus switches may be controlled directly by the host software driver running on host processor 602. For example, the bus switches may receive control signals from host processor 602 via path 616. Each bus switch may receive data from one of its inputs and forward that data to a selected one of its north or south output. The pipelining ensures that the fan-out is low (e.g., maximum of two in this example), which is helpful for trying to achieve the target maximum operating frequency Fmax. In general, control path 616 may be a relatively slow path compared to path 612 or 614. In contrast to data paths 612 and 614, control path 616 does not have as stringent performance requirements and therefore does not require the same performance optimizations.

The shared north and south node at each pipeline stage also provides support for partial reconfiguration (PR). Host processor 602 will ensure that at most one processing node in any given node pair stage is undergoing PR. For example, if processing node P4 (shaded in FIG. 6) is undergoing partial reconfiguration, then bus switch S2 will simply pass data to active node P3. Configured in this hybrid arrangement, system 600 will be able to perform partial reconfiguration without severing the network while also providing high Fmax. Host processor 602 may be in charge of initiating the PR operations, quiescing traffic to any node that is undergoing the PR operations, and making sure all data is being received and processed at the intended processing nodes.

In addition to the north and south input/output ports, the bus switches may also be provided with a bypass path 650. If a bus switch is aware that the received packet is not intended for either node in that pipeline stage, the bus switch can simply pass the packet directly to the subsequent bus switch through either the north or south egress paths. Moreover, use of an optional bypass path 650 may further allow both nodes in a given pipeline stage to undergo PR. For example, if both processing nodes P3 and P4 in FIG. 6 are unavailable, data may be passed from bus switch S2 directly to bus switch S3 via bypass path 650' without severing the network.

The example of FIG. 6 in which system 600 includes only six processing nodes P1-P6 is merely illustrative and is not intended to limit the scope of the present embodiments. In general, system 600 may include any number of processing nodes arranged in any number of pipeline stages, where each pipeline stage has at least two or more shared processing nodes (e.g., each pipeline stage may have a fan-out of two or more, a fan-out of three or more, etc.).

Figure 7A:
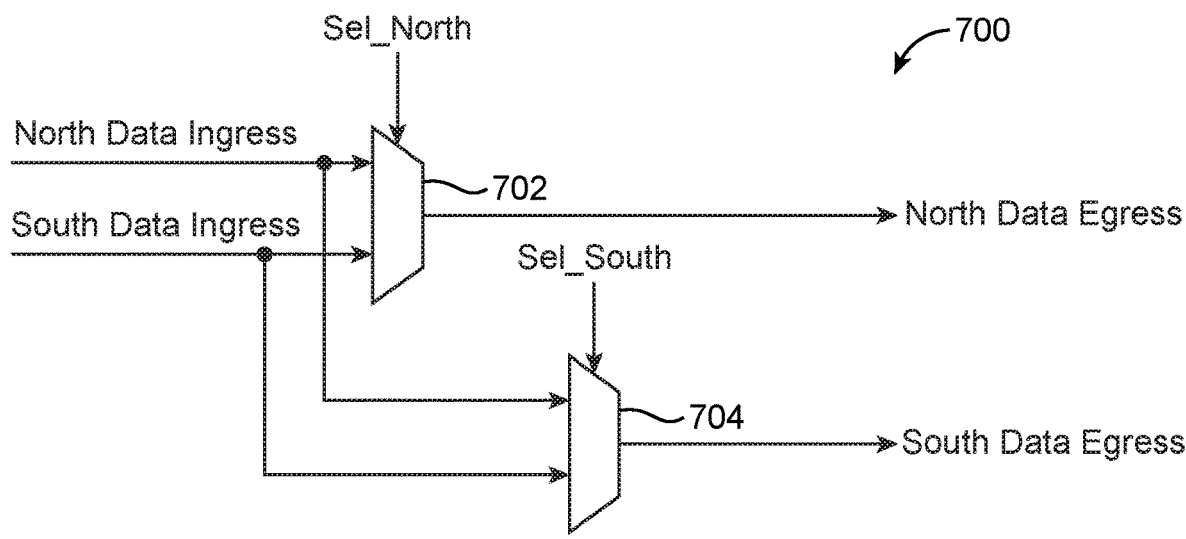
FIG. 7A is a diagram of illustrative multiplexing circuits that can be provided within a bus switch in accordance with an embodiment.

FIG. 7A is a diagram showing multiplexing circuitry 700 that can be included within a bus switch. As shown in FIG. 7A, the bus switch may include multiplexing circuits such as first multiplexer 702 and second multiplexer 704. Multiplexer 702 may have a first input that receives data from the north ingress port, a second input that receives data from the south ingress port, an output that serves as the north egress port, and a control input that receives first control signal Sel_North. Signal Sel_North may configure multiplexer 702 to route data from a selected one of its input ports to its output. Similarly, multiplexer 704 may have a first input that receives data from the north ingress port, a second input that receives data from the south ingress port, an output that serves as the south egress port, and a control input that receives second control signal Sel_South. Signal Sel_South may configure multiplexer 704 to route data from a selected one of its input ports to its output.

Each processing node may be assigned its own address. Thus, the bus switches have to be aware of the node addresses in order to determine whether to pass incoming data to the north or south egress node. As described above, the bus switch must also be aware of the PR operation in order to force switching to the opposite node if one of the nodes is undergoing PR.

Figure 7B:
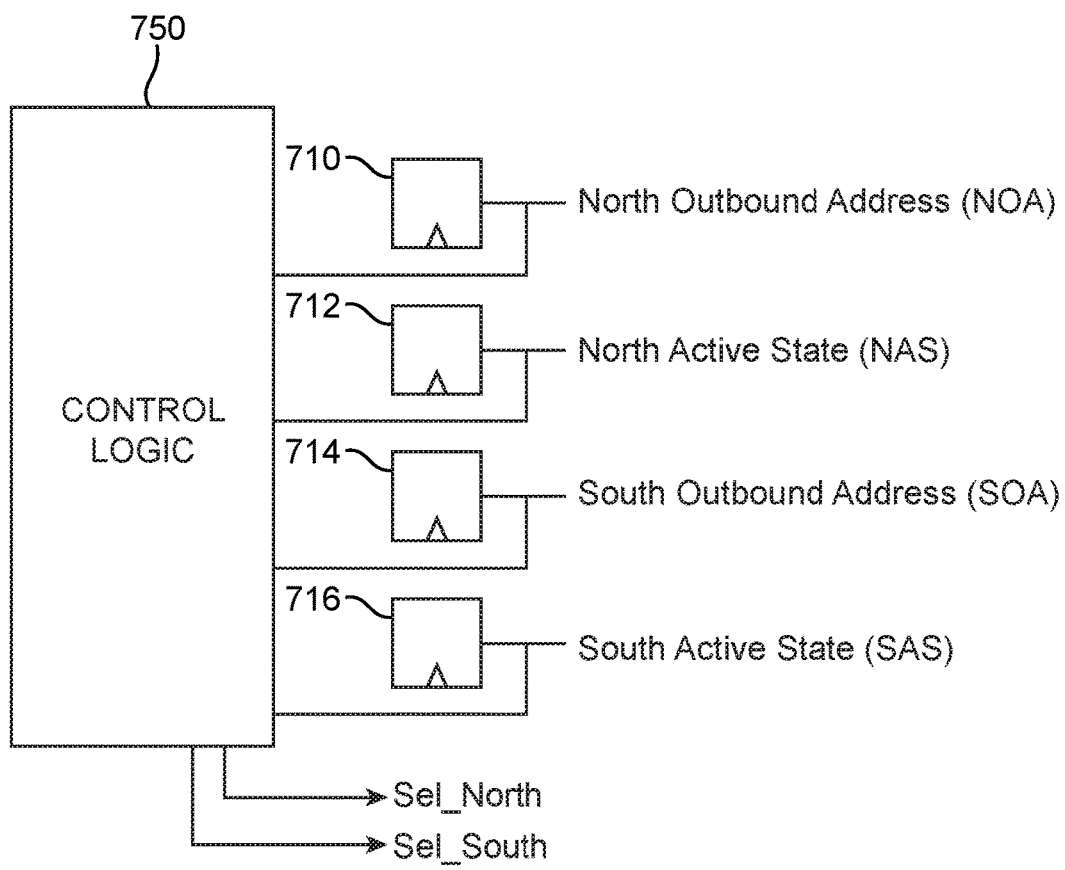
FIG. 7B is a diagram of illustrative state-holding registers and associated control logic that can be provided within a bus switch in accordance with an embodiment.

FIG. 7B is a diagram of illustrative state-holding registers and associated control logic that can be provided for a bus switch in accordance with an embodiment. As shown in FIG. 7B, a bus switch may have a first configuration register 710 that keeps track of a north outbound address NOA (i.e., the address of the processing node connected at its north egress port) and a second configuration register 712 that keeps track of a north active state NAS (i.e., a state that shows whether the processing node connected at its north egress port is active or is currently unavailable due to PR).

The bus switch may also be provided with a third configuration register 714 that keeps track of a south outbound address SOA (i.e., the address of the processing node connected at its south egress port) and a fourth configuration register 716 that keeps track of a south active state SAS (i.e., a state that shows whether the processing node connected at its south egress port is active or is currently unavailable due to PR). The NAS/SAS may be asserted (e.g., set to a logic "1") if the corresponding node is active or may be deasserted (e.g., set to a logic "0") if the corresponding node is inactive (i.e., if the processing node is currently undergoing partial reconfiguration operations).

Still referring to FIG. 7B, control circuitry such as control logic 750 may be provided that monitors each of the configuration register outputs to determine how data should be routed through each bus switch. For example, control logic 750 may check whether the intended address of the incoming packet matches either the NOA or the SOA. It there is no match, the bus switch may simply pass the packet to any active node at its output (e.g., by selectively asserting Sel_North or Sel_South). If there is a match, the bus switch will pass the packet to the intended node, assuming it is active.

In one embodiment, configuration registers 710, 712, 714, and 716 may be included within each bus switch. Similarly, control logic 750 may also be provided at each bus switch. If desired, however, the configuration registers and/or control logic 750 may be centrally maintained at host processor 602 so that the master software driver can handle all the traffic and routing all in one place.

Figure 8:
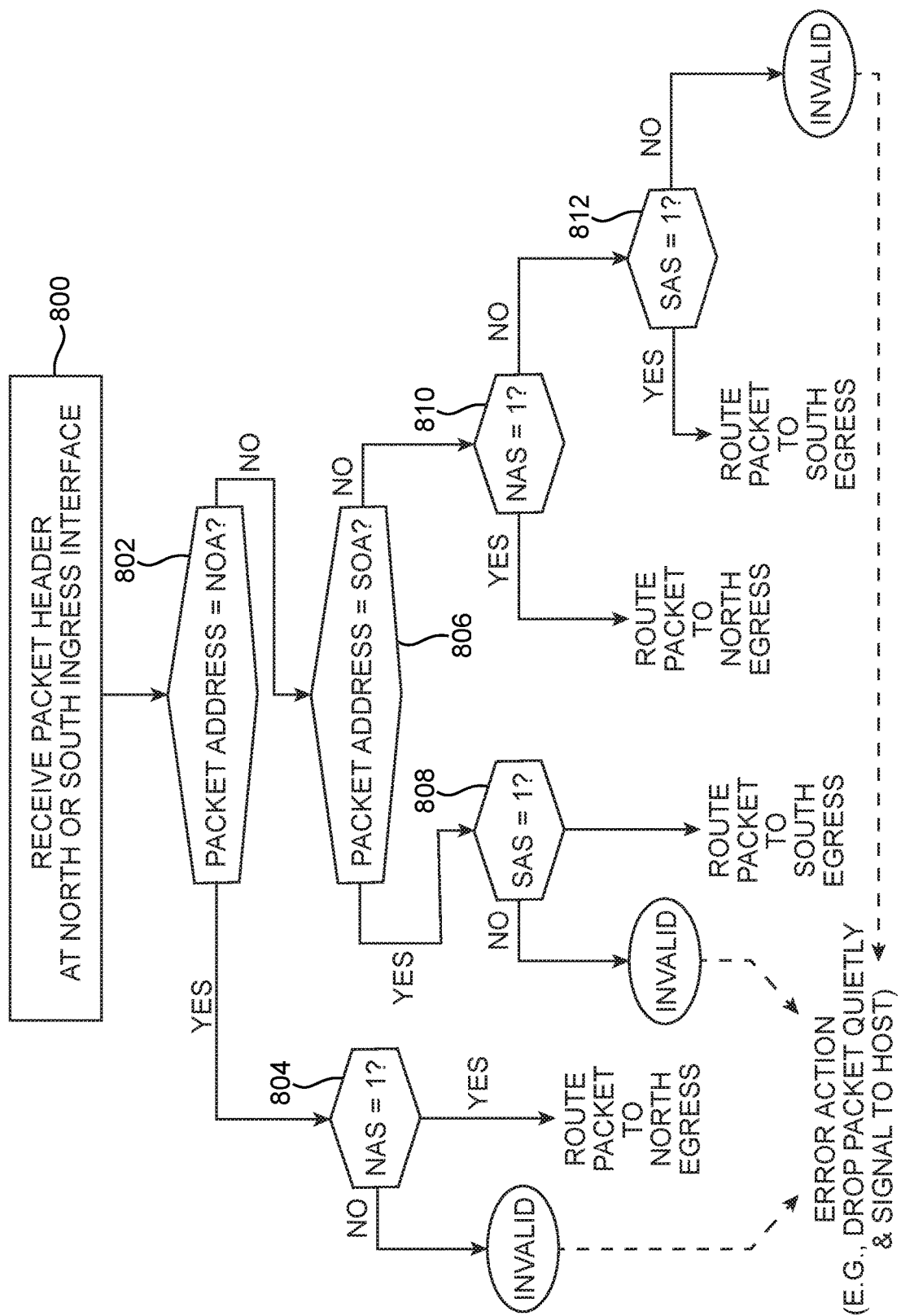
FIG. 8 is a flow chart of illustrative steps for operating a bus switch in the hybrid shared-pipelined architecture of FIG. 6 in accordance with an embodiment.

FIG. 8 is a flow chart of illustrative steps for operating a bus switch in the hybrid shared-pipelined architecture of FIG. 6 in accordance with an embodiment. At step 800, the bus switch may receive a packet header at the north or south ingress interface.

At step 802, the bus switch may determine whether the packet address in the header matches the north outbound address NOA stored in configuration register 710. If so, the bus switch may then determine whether the north active state NAS in register 712 is asserted. If so, the incoming packet may be routed to the processing node at the north egress interface. If not, an invalid command has been issued and an appropriate error action may be taken (e.g., the bus switch may quietly drop the packet and notify the host of the dropped packet).

Referring back to step 802, if the packet address does not match north outbound address NOA, the bus switch may then determine whether the packet address matches the southbound address SOA stored in configuration register SOA (step 806). If so, the bus switch may then determine whether the south active state SAS in register 716 is asserted. If so, the incoming packet may be routed to the processing node at the south egress interface. If not, an invalid command has been issued and an appropriate error action may be taken.

If, however, the packet address does not match southbound address SOA, this means that the packet can be passed to any active node in that pipeline stage. At step 810, the bus switch may determine whether the north egress processing node is active (e.g., by checking the state of NAS). If NAS is asserted, the packet may be routed to the north egress port and simply passed through the north processing node to the next bus switch. If NAS is deasserted, the bus switch may determine whether the south egress processing node is active (e.g., by checking the state of SAS). If SAS is asserted, the packet may be routed to the south egress port and simply passed through the south processing node to the next bus switch. If SAS is deasserted, an invalid command has been issued and an appropriate error action may be taken. Alternative, if not NAS and SAS are deasserted (i.e., if not north and south processing nodes are undergoing partial reconfiguration), the packet may be directly forwarded to the next bus switch via a bypass path (see, e.g., bypass path 650 in FIG. 6).

Figure 9:
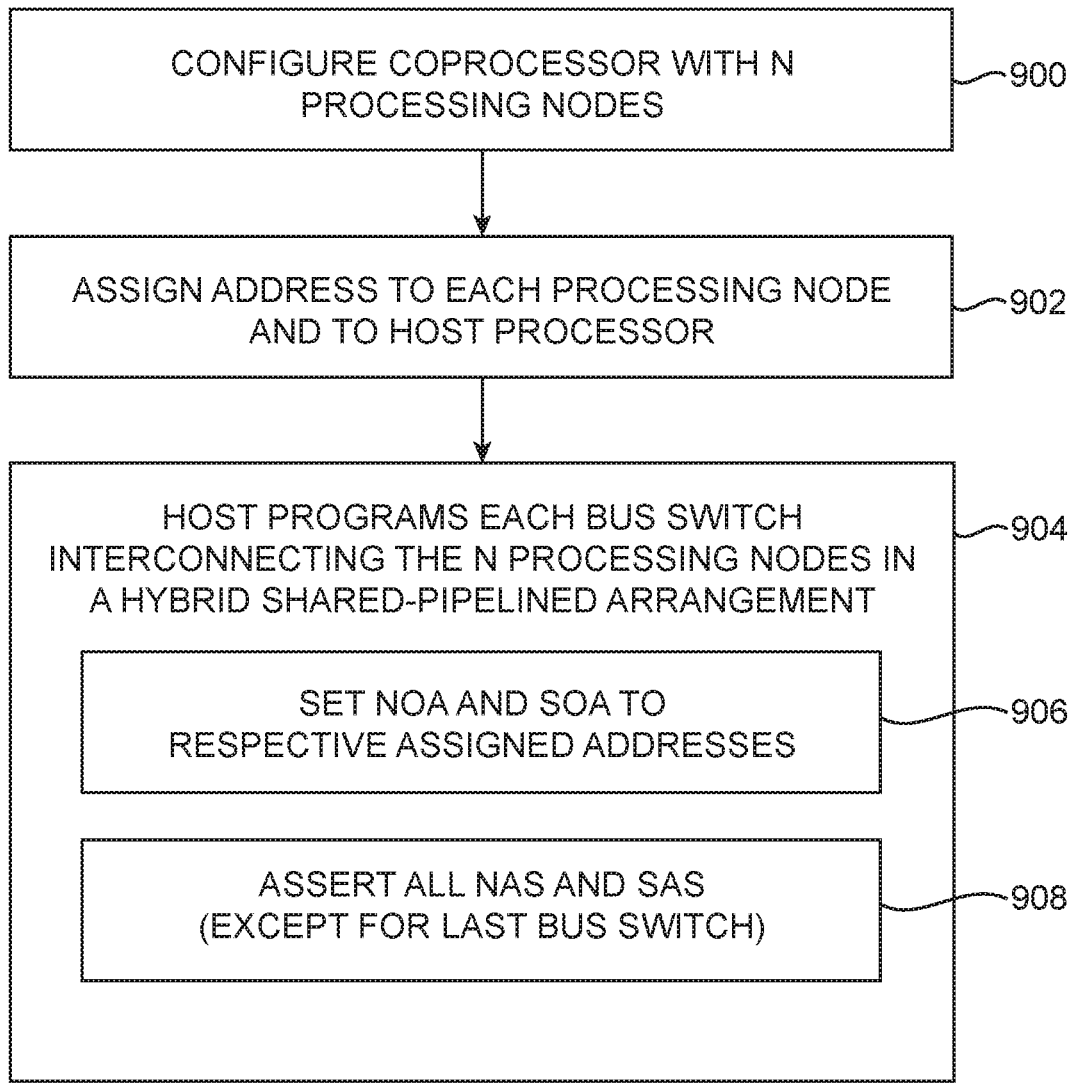
FIG. 9 is a flow chart of illustrative steps for initializing the hybrid shared-pipelined topology of FIG. 6 in accordance with an embodiment.

FIG. 9 is a flow chart of illustrative steps for initializing the hybrid shared-pipelined topology of FIG. 6 in accordance with an embodiment. At step 900, the coprocessor may be configured with N processing nodes (e.g., a plurality of accelerator blocks each of which can support a respective functionality). At step 902, the host processor may assign a respective address to each of the N processing nodes in the coprocessor. The host processor may also be assigned a host address.

At step 904, the host processor may be used to program each bus switch that is interconnected with the N processing nodes. In particular, each bus switch may be connected to at least two shared processing nodes in that pipeline stage. More than two shared processing nodes may be coupled at each pipeline stage, if desired. The N processing nodes may be configured in any number of pipeline stages.

At step 906, the host processor may set the north outbound address NOA and the sound outbound address SOA to the corresponding assigned addresses of the processing nodes connected at the output of each bus switch. At step 908, the host processor may also assert the north active state NAS and the south active state SAS for each bus switch (except for the last bus switch). In the example of FIG. 6, the last bus switch may have its NAS asserted since the north egress port is connected to the host processor and may have its SAS deasserted since the south egress port is dangling.

Figure 10:
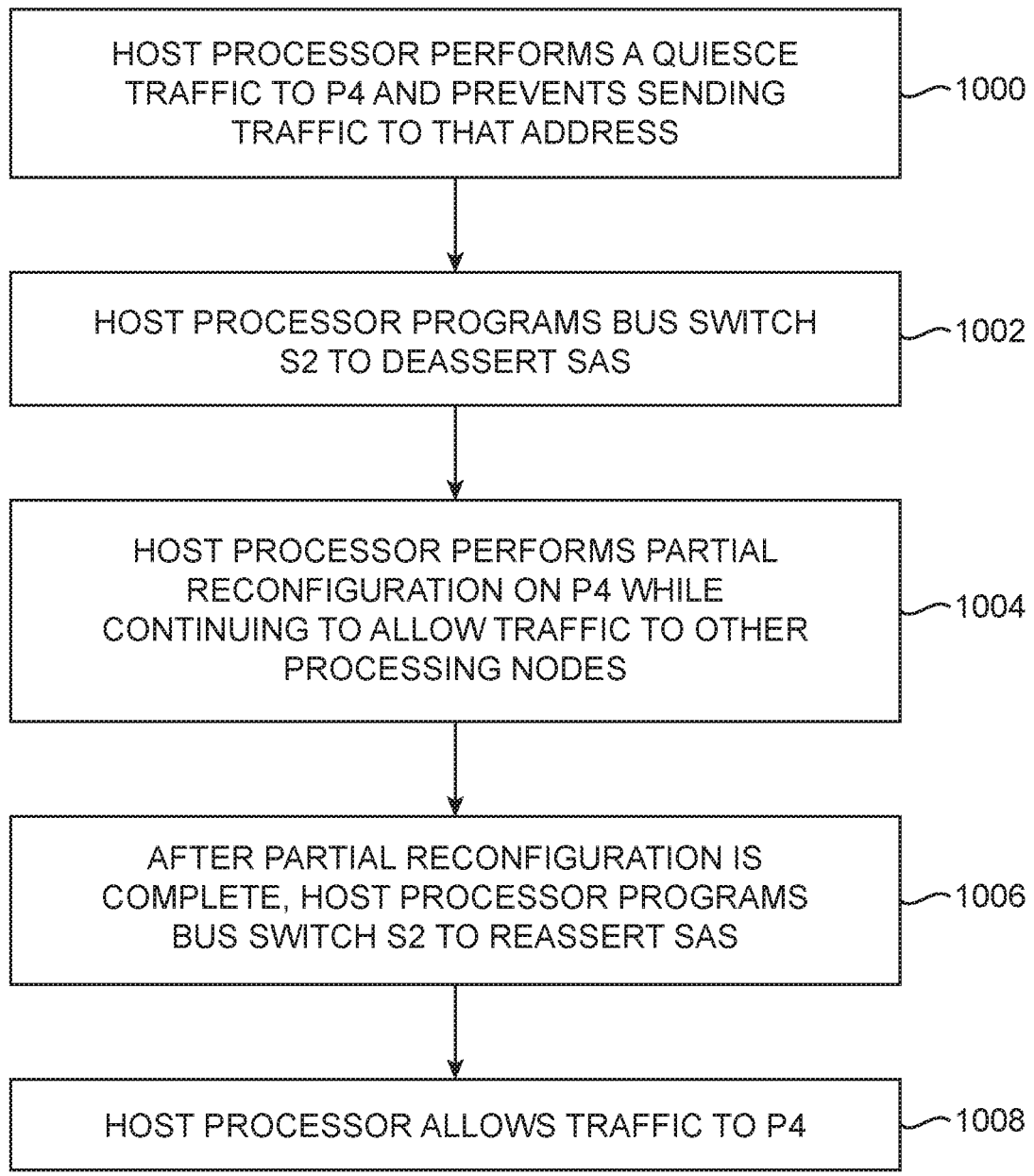
FIG. 10 is a flow chart of illustrative steps for performing partial reconfiguration on the hybrid shared-pipelined topology of FIG. 6 in accordance with an embodiment.

FIG. 10 is a flow chart of illustrative steps for performing partial reconfiguration on the hybrid shared-pipelined topology of FIG. 6 in accordance with an embodiment. The exemplary steps of FIG. 10 aims to perform a partial reconfiguration of processing node P4 in the coprocessor.

At step 1000, the host processor may begin by quiescing traffic to processing node P4 (e.g., the host processor will prevent any packets to be sent to the address assigned to node P4). At step 1002, the host processor may program bus switch S2 to assert the south active state SAS since node P4 is temporarily switched out of use.

At step 1004, node P4 may undergo partial reconfiguration while all other remaining processing nodes in the coprocessor remain active. In other words, the master/host processor may continue sending traffic to the other active accelerator blocks.

After partial reconfiguration is complete, the host processor may reprogram bus switch S2 to reassert south active state SAS to indicate that node P4 is switched back into use (step 1006). At step 1008, the host processor may then allow traffic to flow to node P4.

The steps of FIG. 10 are merely illustrative and are not intended to limit the scope of the present embodiments. If desired, partial reconfiguration may be performed on any one of the processing nodes, any two of the processing nodes, or more than two processing nodes simultaneously as long as the overall network pipeline is not severed by the inactive node(s). As described above, a bypass path may also be implemented to help bypass any pipeline stage whenever all the processing nodes in that stage is undergoing PR.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs). Examples of programmable logic devices include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system. In one embodiment, the programmable logic device may be one of the family of devices owned by ALTERA/ INTEL Corporation.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

The foregoing is merely illustrative of the principles of this invention and various modifications can be made by those skilled in the art. The foregoing embodiments may be implemented individually or in any combination.

What is claimed is:

1. An integrated circuit, comprising:
a first processing node;
a second processing node;
a third processing node; and
a bus switch having outputs coupled to the first and second processing nodes in a hybrid shared-pipelined topology, wherein the bus switch is configured to receive a packet from the third processing node and to route the received packet to at most one of the first and second processing nodes, and wherein the bus switch is configured to route the received packet to the first processing node in response to determining that the second processing node is undergoing partial reconfiguration.

2. The integrated circuit of claim 1, further comprising:
an additional bus switch that receives the packet from a selected one of the first and second processing nodes, wherein the bus switch and the additional bus switch are part of a pipeline, and wherein the additional bus switch follows the bus switch in the pipeline.

3. The integrated circuit of claim 2, further comprising:
a bypass path that bypasses the first and second processing nodes and connects the bus switch directly to the additional bus switch.

4. The integrated circuit of claim 2, further comprising:
a fourth processing node that is connected to the additional bus switch; and
a fifth processing node that is connected to the additional bus switch, wherein the additional bus switch is operable to route the packet to a selected one of the fourth and fifth processing nodes.

5. The integrated circuit of claim 1, wherein the second processing node is temporarily inactive when the second processing node is undergoing partial reconfiguration.

6. The integrated circuit of claim 1, wherein the bus switch comprises:
a first input;
a second input;
a first multiplexer that receives signals from the first and second inputs and that has an output that is connected to the first processing node; and
a second multiplexer that receives signals from the first and second inputs and that has an output that is connected to the second processing node.

7. The integrated circuit of claim 1, further comprising:
a first configuration register that stores an address of the first processing node; and
a second configuration register that stores an address of the second processing node.

8. The integrated circuit of claim 7, further comprising:
a third configuration register that stores a bit that indicates whether the first processing node is active; and
a fourth configuration register that stores a bit that indicates whether the second processing node is active.

9. A method of operating a system that includes a host processor and a coprocessor, the method comprising:
initializing the coprocessor, wherein the coprocessor includes a plurality of processing nodes connected in a hybrid shared-pipelined topology;
after initializing the coprocessor, performing partial reconfiguration on a selected processing node in the plurality of processing nodes; and
while the selected processing node is undergoing partial reconfiguration, sending packets from the coprocessor to the host processor.

10. The method of claim 9, further comprising:
with the host processor, quiescing traffic to the selected processing node while the selected processing node is undergoing partial reconfiguration.

11. The method of claim 9, wherein initializing the coprocessor comprises assigning a respective address to each processing node in the plurality of processing nodes.

12. The method of claim 11, wherein the coprocessor includes a plurality of bus switches coupled in series with the plurality of processing nodes, wherein initializing the coprocessor comprises:
for a given bus switch in the plurality of bus switches, assigning a first outbound address to the address of a first processing node in the plurality of processing nodes that is connected to the given bus switch; and
for the given bus switch, assigning a second outbound address to the address of a second processing node in the plurality of processing nodes that is connected to the given bus switch.

13. The method of claim 12, wherein initializing the coprocessor further comprises:
for the given bus switch, asserting a first active state that indicates whether the first processing node is ready to receive data from the host processor; and
for the given bus switch, asserting a second active state that indicates whether the second processing node is ready to receive data from the host processor.

14. The method of claim 13, further comprising:
sending a given packet from the host processor to the coprocessor; and
comparing address information in the given packet to the first outbound address and the second outbound address to determine whether the given bus switch should route the given packet to the first processing node or the second processing node.

15. The method of claim 14, further comprising:
deasserting the first active state whenever the first processing node is undergoing partial reconfiguration;
deasserting the second active state whenever the second processing node is undergoing partial reconfiguration;
checking to see whether the first active state is asserted before sending the given packet to the first processing node; and
checking to see whether the second active state is asserted before sending the given packet to the second processing node.

16. A system, comprising:
a host processor; and
a coprocessor that serves as a hardware accelerator for the host processor, wherein the coprocessor comprises:
a first bus switch;
a second bus switch coupled in series with the first bus switch;

a third bus switch coupled in series with the second bus switch;

first and second accelerator blocks coupled in parallel between the first and second bus switches; and third and fourth accelerator blocks coupled in parallel between the second and third bus switches.

17. The system of claim 16, wherein the second bus switch is configured to receive information from the first bus switch via no more than one of the first and second accelerator blocks during normal operation, and wherein partial reconfiguration is performed on the first accelerator block while the host processor continues to pass data through the second accelerator block.

18. The system of claim 16, wherein the coprocessor further comprises:

a first bypass path connecting the first bus switch directly to the second bus switch; and a second bypass path connecting the second bus switch directly to the third bus switch.

19. The system of claim 16, wherein the first, second, and third bus switches are controlled by the host processor.

20. The system of claim 16, wherein the first bus switch determines whether to route an incoming packet to the first accelerator block or the second accelerator block based on address information and active state information associated with the first and second accelerator blocks.

* * * * *